(12) United States Patent
Yamada

(10) Patent No.: US 6,999,638 B2
(45) Date of Patent: Feb. 14, 2006

(54) SEMICONDUCTOR WAVEGUIDE DEVICE

(75) Inventor: Koji Yamada, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 257 days.

(21) Appl. No.: 10/112,938

(22) Filed: Apr. 2, 2002

(65) Prior Publication Data

US 2003/0185481 A1    Oct. 2, 2003

(51) Int. Cl.
*G02F 1/035* (2006.01)

(52) U.S. Cl. .......................... 385/2; 385/129; 385/132

(58) Field of Classification Search .................. 385/2, 385/129, 132

See application file for complete search history.

(56) References Cited

U.S. PATENT DOCUMENTS 5,987,046 A * 11/1999 Kobayashi et al. ........... 372/45
6,167,070 A * 12/2000 Sakata ........................ 372/45

FOREIGN PATENT DOCUMENTS

| JP | 07-230067  | 8/1995 |
| JP | 11-202274  | 7/1999 |
| JP | 2001-091913 | 4/2001 |
| JP | 2001-117058 | 4/2001 |

* cited by examiner

*Primary Examiner*—Ellen E. Kim
(74) *Attorney, Agent, or Firm*—Rabin & Berdo, P.C.

(57) ABSTRACT

A semiconductor waveguide device includes a lower clad layer, an upper clad layer, an optical waveguide layer interposed between the lower clad layer and the upper clad layer, and a lower electrode and an upper electrode for applying a voltage to a laminated structure including the lower clad layer, the optical waveguide layer, and the upper clad layer. Light is made incident from an end face of the optical waveguide layer. The upper clad layer includes a stripe-like width-narrowed portion, and a width-broadened portion formed at a position closer to a light-incident end face than the width-narrowed portion and having a width wider than the width-narrowed portion.

19 Claims, 15 Drawing Sheets

FIG. 26(a)
FIG. 26(b)
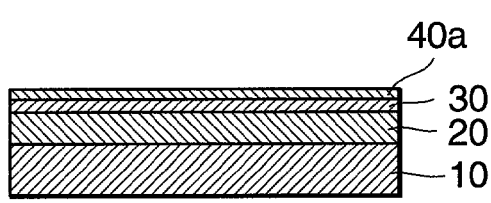
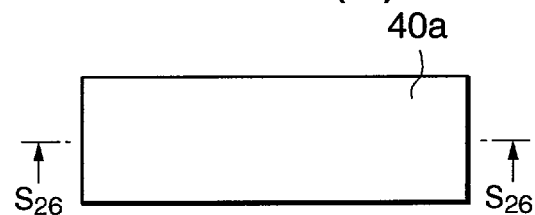
FIG. 27(a)
FIG. 27(b)
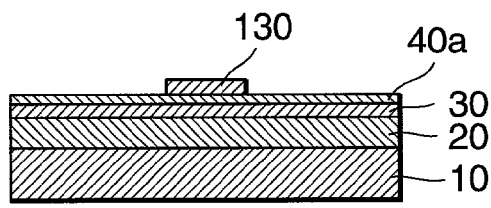
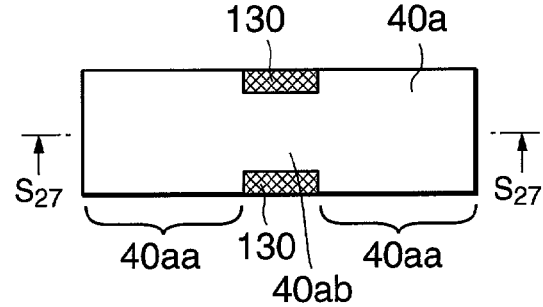
FIG. 28(a)
FIG. 28(b)
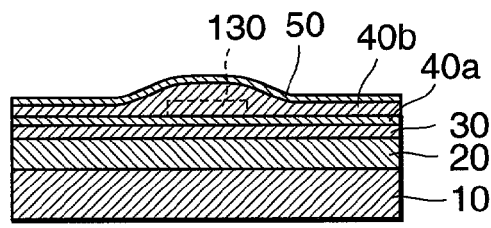
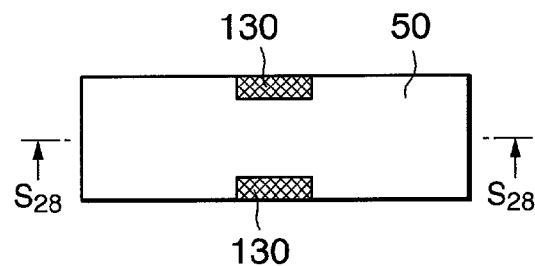
FIG. 29(a)
FIG. 29(b)
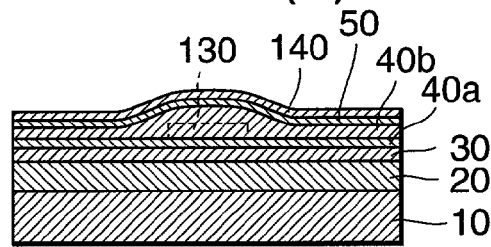
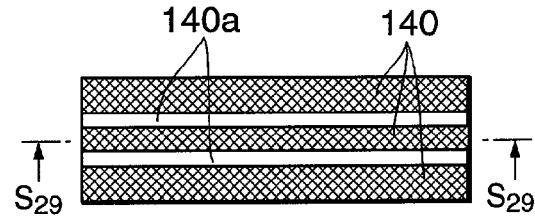

SEMICONDUCTOR WAVEGUIDE DEVICE

BACKGROUND OF THE INVENTION

The present invention relates to a semiconductor waveguide device such as an electric absorption type optical intensity modulator (EA modulator), a supersaturated absorption device (SA device) or the like, and a manufacturing method thereof, and particularly to a structure in the neighborhood of an end face into which input light is launched.

Applications of such an EA modulator for various uses such as an optical gate, an optically controlled optical switch, etc. as well as for an electrooptical converter, have been discussed. Therefore, an increasing demand for a higher input light power allowable for the EA modulator has been expected.

A problem, however, arises in that when either input light power or a reverse voltage is increased at the EA modulator, a large photocurrent is produced in a core layer disposed in the neighborhood of a light-incident end face, and the temperature of the neighborhood thereof reaches a melting point of a semiconductor material, whereby a device is brought into destruction.

Particularly, a rib type (or ridge type) waveguide device having a channel structure is accompanied by a problem that since both sides of a ridged portion thereof are air or a polyimide filled layer, heat generated due to a photocurrent is hard to be radiated, and allowable input light power is low.

SUMMARY OF THE INVENTION

The present invention has therefore been made to solve the problems of the related arts. An object of the invention is to provide a semiconductor waveguide device high in allowable input light power, and a manufacturing method thereof.

A semiconductor waveguide device of the present invention includes a lower clad layer, an upper clad layer, an optical waveguide layer interposed between the lower clad layer and the upper clad layer, and a lower electrode and an upper electrode for applying a voltage to a laminated structure including the lower clad layer, the optical waveguide layer, and the upper clad layer. Light is made incident from an end face of the optical waveguide layer. The upper clad layer includes a stripe-like width-narrowed portion, and a width-broadened portion formed at a position closer to a light-incident end face than the width-narrowed portion and having a width wider than the width-narrowed portion.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIGS. 26(*a*) and 26(*b*) are respectively process diagrams (part 1) showing a method of manufacturing the semiconductor waveguide device shown in FIG. 24;

FIGS. 27(*a*) and 27(*b*) are respectively process diagrams (part 2) illustrating the method of manufacturing the semiconductor waveguide device shown in FIG. 24;

FIGS. 28(*a*) and 28(*b*) are respectively process diagrams (part 3) depicting the method of manufacturing the semiconductor waveguide device shown in FIG. 24;

FIGS. 29(a) and 29(b) are respectively process diagrams (part 4) showing the method of manufacturing the semiconductor waveguide device shown in FIG. 24;

DETAILED DESCRIPTION OF THE PREFERRED EMBODIMENTS

Preferred embodiments of the present invention will hereinafter be described in detail with reference to the accompanying drawings.

Figure 1:
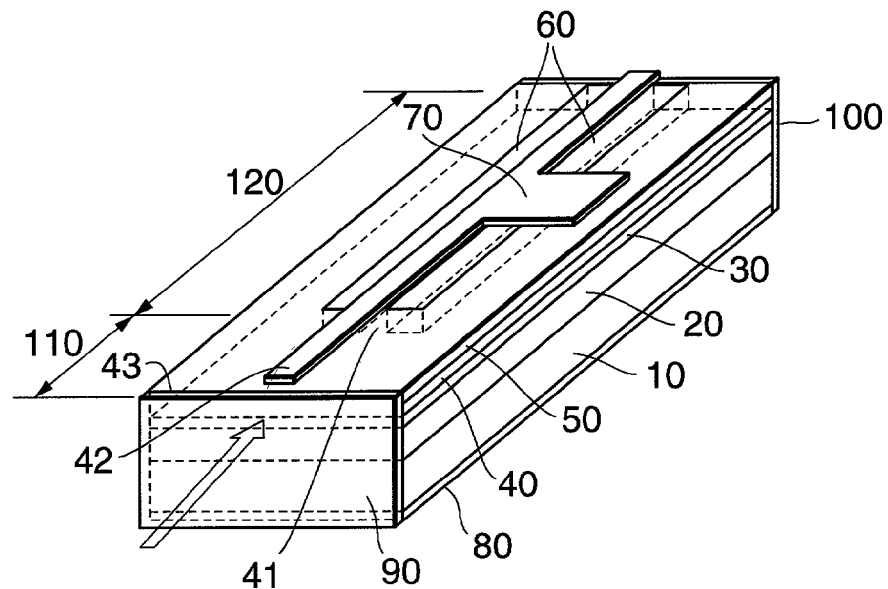
FIG. 1 is a perspective view schematically showing a configuration of a semiconductor waveguide device according to a first embodiment of the present invention.
Figure 2:
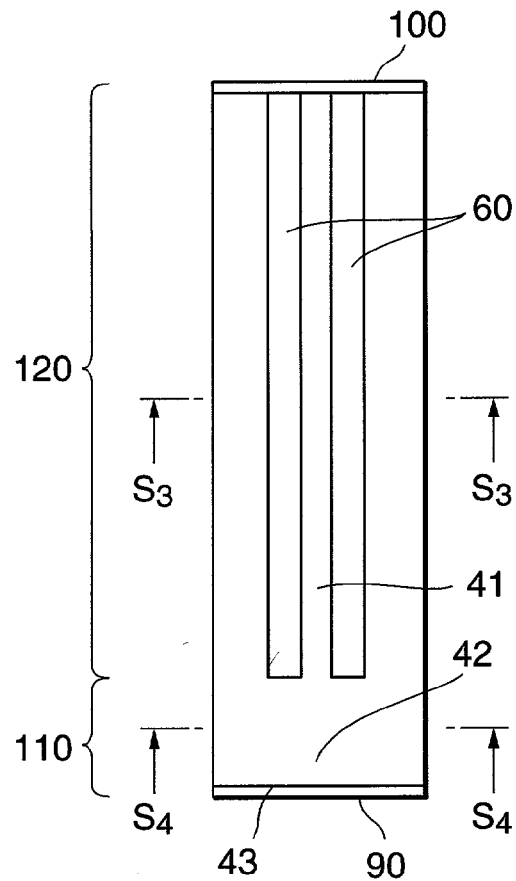
FIG. 2 is a plan view of FIG. 1, which excludes electrodes.
Figure 3:
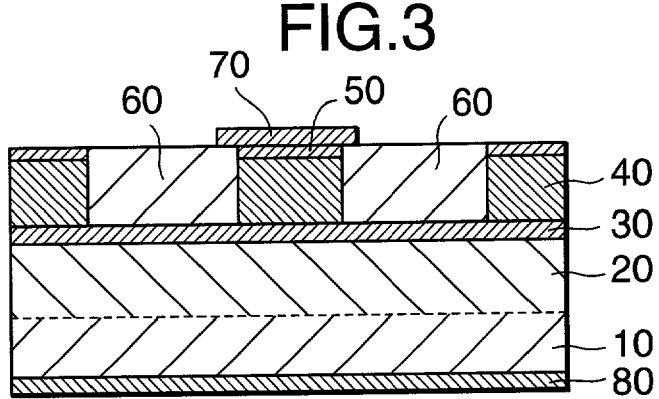
FIG. 3 is a cross-sectional view taken along line $S_3$—$S_3$ of FIG. 2.
Figure 4:
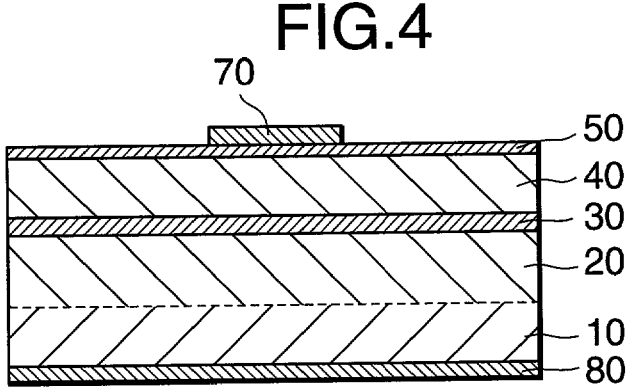
FIG. 4 is a cross-sectional view taken along line $S_4$—$S_4$ of FIG. 2.

FIG. 1 is a perspective view schematically showing a configuration of a semiconductor waveguide device according to a first embodiment of the present invention. FIG. 2 is a plan view of FIG. 1 (with the exception of electrodes), FIG. 3 is a cross-sectional view taken along line $S_3$—$S_3$ of FIG. 2, and FIG. 4 is a cross-sectional view taken along line $S_4$—$S_4$ of FIG. 2, respectively.

As shown in FIG. 1, the semiconductor waveguide device according to the first embodiment comprises a slab type waveguide structure portion 110 constituted as one waveguide end-face side and a rib (ridge) type waveguide structure portion 120 formed integrally with the slab type waveguide structure portion 110, which is constituted as the other waveguide end-face side. While the semiconductor waveguide device according to the first embodiment is of an EA modulator and an SA device, for example, it is not necessarily limited to these.

The semiconductor waveguide device according to the first embodiment has a substrate 10 formed of a first conductive type semiconductor, a lower clad layer 20 formed of the first conductive type semiconductor, which is provided over the substrate 10, an optical waveguide layer 30 provided over the lower clad layer 20, an upper clad layer 40 formed of a second conductive type semiconductor (i.e., which is of a conductive type different from the first conductive type), which is provided over the optical waveguide layer (active layer or core layer) 30, and an ohmic contact layer 50 provided over the upper clad layer 40. In the first embodiment, the substrate 10 is formed of $n^+$-InP, the lower clad layer 20 is formed of n-InP, the optical waveguide layer 30 is formed of undoped (impurity implanting process-free) —InGaAsP, the upper clad layer 40 is formed of p-InP, and the ohmic contact layer 50 is formed of $p^+$-InGaAs, respectively. However, the materials for the respective layers are not necessarily limited to those referred to above.

Owing to the laminated structure referred to above, a vertically-extending light confined structure is formed over the whole length of the semiconductor waveguide device. A rib type waveguide structure portion 120 is formed adjacent to a slab type waveguide structure portion 110 whose length ranges from about 10 μm to about 20 μm.

The upper clad layer 40 has a width-narrowed portion 41 which constitutes a stripe-like ridged structure, and a width-broadened portion 42 having a width broader than the width-narrowed portion 41, which is formed at a position closer to a light-incoming or—incident end face 43 than the width-narrowed portion 41. Channels 60 are formed on both sides of the stripe-like width-narrowed portion 41. In the first embodiment, the channels 60 respectively have depths for exposing the optical waveguide layer 30 as shown in FIG. 3. Further, the channels 60 are respectively filled with polyimide, for example.

Further, the semiconductor waveguide device according to the first embodiment includes a second conductive type upper electrode 70 provided on the ohmic contact layer 50, and a first conductive type lower electrode 80 provided on the underside of the substrate 10. Incidentally, the upper electrode 70 is formed even on the slab type waveguide structure portion 110. Anti-reflective films (AR films) 90 and 100 are formed on their corresponding light incoming/outgoing end faces.

The semiconductor waveguide device according to the first embodiment performs the input of light from the end face on the slab type waveguide structure portion 110 side. When an electric field is applied to the optical waveguide layer 30 by the upper electrode 70 and lower electrode 80, the light launched into the slab type waveguide structure portion 110 is subjected to light absorption under field absorption effects to produce photocarriers, thereby causing a photocurrent to flow therebetween. At this time, the temperature of the optical waveguide layer 30 itself rises due to thermal resistance thereof. In the slab type waveguide structure portion 110 employed in the first embodiment, however, heat generated in the optical waveguide layer 30 is efficiently dissipated in a transverse direction through the optical waveguide layer 30 and the upper clad layer 40 as distinct from the width-narrowed portion 41 with the channels 60 formed on both sides thereof. Thus, according to the semiconductor waveguide device of the first embodiment, allowable input light power can be improved as compared with a device free of the slab type waveguide structure portion 110.

Figure 5:
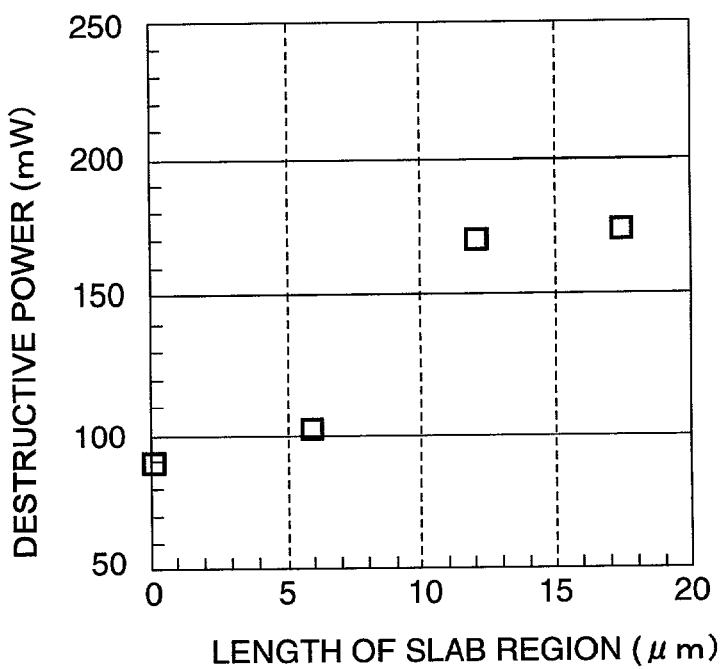
FIG. 5 is a diagram showing an experimental result about the relationship between the length [$\mu$m] of a slab type waveguide structure portion (slab region) and destructive power (the product of a photocurrent and an applied voltage) immediately preceding the destruction of a device.

FIG. 5 is a diagram showing an experimental result indicative of the relationship between the length [μm] of the slab type waveguide structure portion (slab region) 110 and destructive power (product of a photocurrent and an applied voltage) [mW] immediately preceding the destruction of the device. In the drawing shown herein, the power of light launched into the slab type waveguide structure portion 110 was set to 30 mW, and a voltage applied across the optical waveguide layer 30 was changed while using a light having a wavelength of 1.535 μm, whereby destructive power was measured. It turned out from the experimental result shown in FIG. 5 that when the length of the slab region could be set to 10 μm or more, a twice or more improvement in destructive power was made.

Since a process step for growing a crystal for a semiconductor material that constitutes the semiconductor waveguide device according to the first embodiment may be carried out once, a manufacturing process is not complex and a reduction in the cost of the device can be realized.

Figure 6:
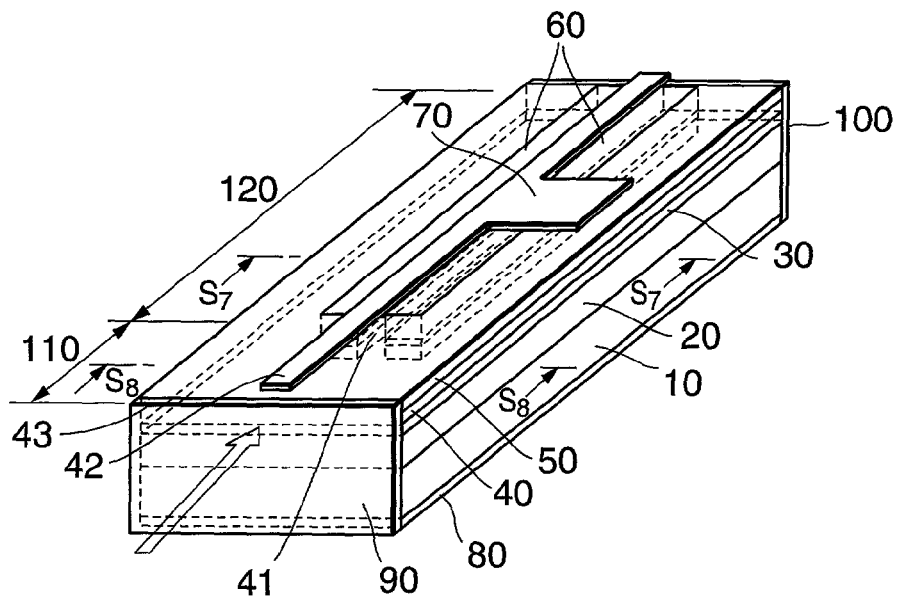
FIG. 6 is a perspective view schematically showing a configuration of a modification of the semiconductor waveguide device according to the first embodiment.
Figure 7:
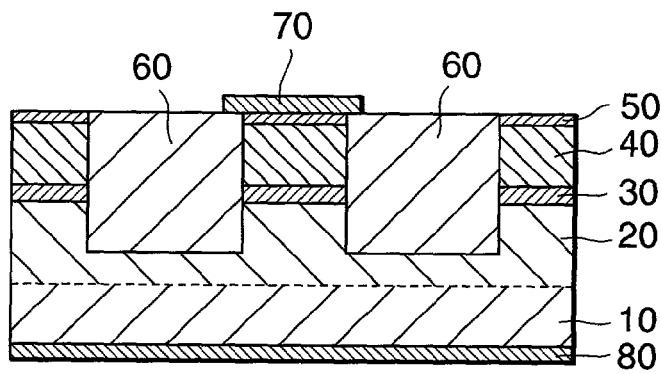
FIG. 7 is a cross-sectional view taken along line $S_7$—$S_7$ of FIG. 6.
Figure 8:
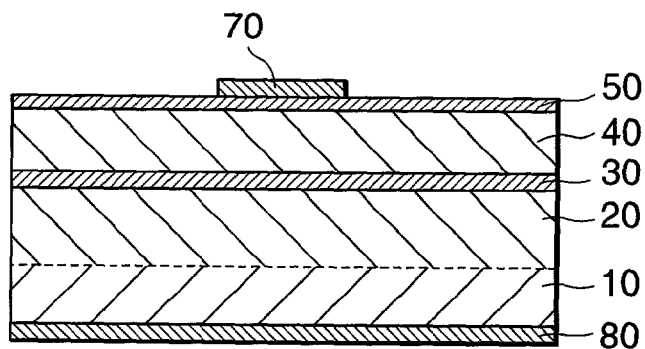
FIG. 8 is a cross-sectional view taken along line $S_8$—$S_8$ of FIG. 6.

FIG. 6 is a perspective view schematically showing a configuration of a modification of the semiconductor waveguide device according to the first embodiment of the invention. FIG. 7 is a cross-sectional view taken along line $S_7$—$S_7$ of FIG. 6, and FIG. 8 is a cross-sectional view taken along line $S_8$—$S_8$ of FIG. 6, respectively. In the semiconductor waveguide device illustrative of the present modification, channels 60 (polyimide charged-portions) are formed deep as compared with the case of FIG. 1 as shown in FIGS. 6 through 8 in such a manner that upper parts of an optical waveguide layer 30 and a lower clad layer 20 respectively have the same width as a width-narrowed portion 41 of an upper clad layer 40. In the modification illustrated in FIGS. 6 through 8, constituent points other than the above are the same as the example shown in FIGS. 1 through 5 referred to above.

Figure 9:
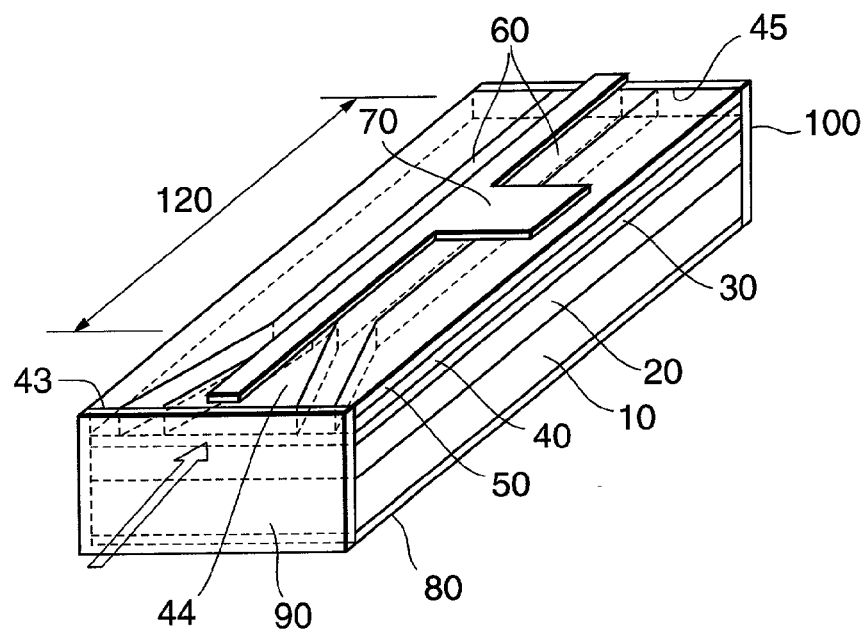
FIG. 9 is a perspective view schematically illustrating a configuration of a semiconductor waveguide device according to a second embodiment of the present invention.
Figure 10:
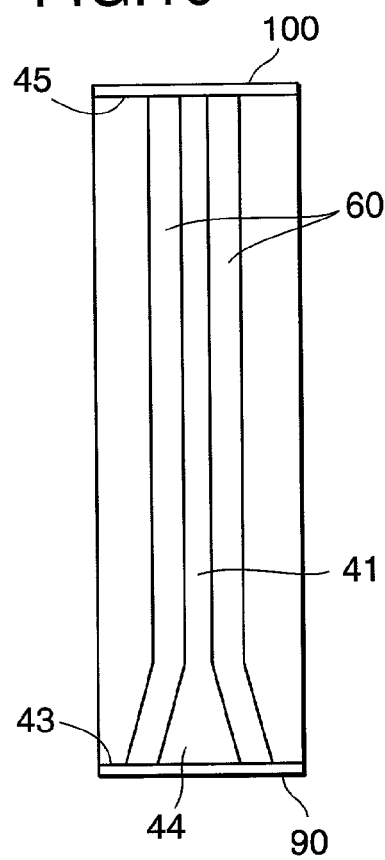
FIG. 10 is a plan view of FIG. 9, which excludes electrodes.

FIG. 9 is a perspective view schematically showing a configuration of a semiconductor waveguide device according to a second embodiment of the present invention. FIG. 10 is a plan view of FIG. 9 (with the exception of electrodes). As shown in these drawings, the semiconductor waveguide device according to the second embodiment is different from that according to the first embodiment in that channels 60 extend to a light-incident end face 43, and the width of a width-broadened portion 44 of an upper clad layer 40 is shaped in tapered form so as to expand as it approaches the light-incident end face 43.

According to the semiconductor waveguide device of the second embodiment, since heat generated in an optical waveguide layer 30 is efficiently dissipated in a transverse direction through the optical waveguide layer 30 and the upper clad layer 40 shaped in tapered form, allowable input light power can be enhanced as compared with a device free of the provision of the width-broadened portion at the upper clad layer 40.

Since a process step for growing a crystal for a semiconductor material that constitutes the semiconductor waveguide device according to the second embodiment may be once in a manner similar to the first embodiment, a production process becomes no complex and a reduction in the cost of the device can be achieved.

Further, according to the semiconductor waveguide device of the second embodiment, when light is made incident from the end face 43, it propagates through a waveguide to reach the other end face 45, where it is reflected, followed by moving backward along the waveguide. The reversed-moved light spreads at the width-broadened portion 44 shaped in tapered form and thereby falls on the incident end face 43. While the reflection of the light occurs due to residual reflection, a component propagated outwardly of each channel is radiated without being focused on the waveguide because the reflected light propagates while its spread angle is being held. It is therefore possible to suppress interference between output light and multiple reflected light from the end face 45, output a high-quality optical modulation signal reduced in interference noise, reduce an error rate, and enlarge a transmission distance in optical communications.

Figure 11:
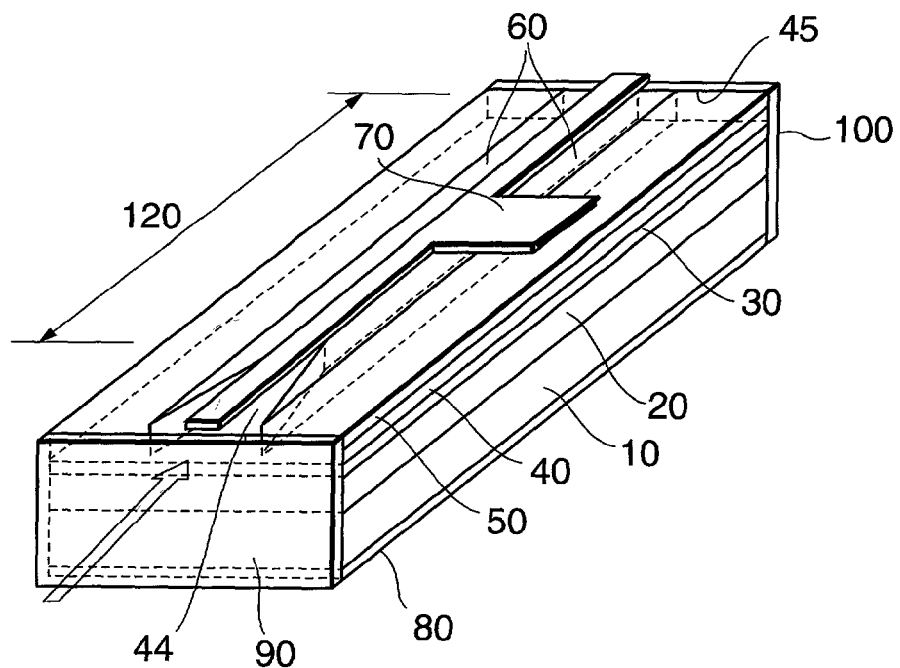
FIG. 11 is a perspective view schematically showing a configuration of a modification of the semiconductor waveguide device according to the second embodiment.
Figure 12:
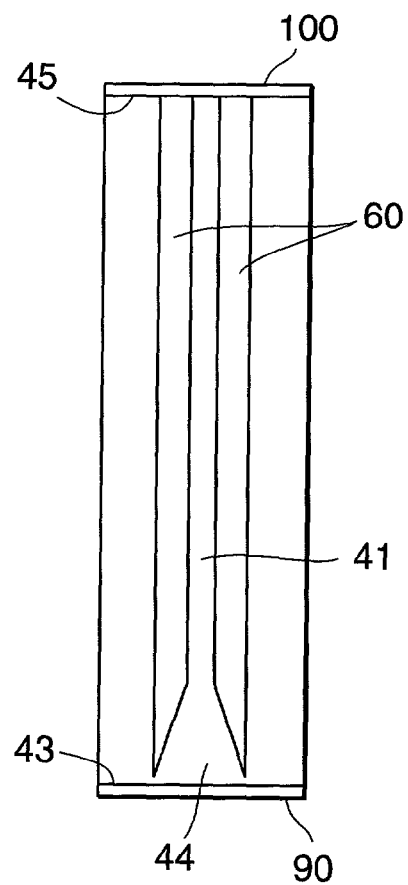
FIG. 12 is a plan view of FIG. 11, which excludes electrodes.

FIG. 11 is a perspective view schematically showing a configuration of a modification of the semiconductor waveguide device according to the second embodiment. FIG. 12 is a plan view of FIG. 10 (except for electrodes). As shown in these drawings, the semiconductor waveguide device illustrative of the present modification is different from the example shown in FIGS. 9 and 10 in that channels 60 become slender as it approaches a light-incident end face 43, and the leading ends or tips of the channels 60 do not reach the light-incident end face 43.

Figure 13:
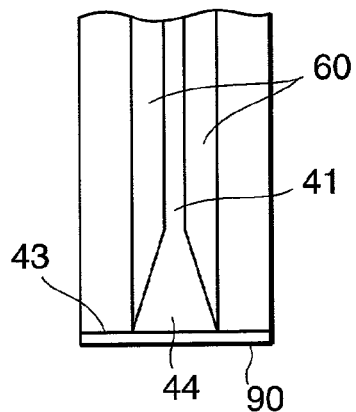
FIG. 13 is a plan view excluding electrodes, of another modification of the semiconductor waveguide device according to the second embodiment.

Further, FIG. 13 is a plan view (excluding electrodes) showing another modification of the semiconductor waveguide device according to the second embodiment. The example illustrated in FIG. 13 is different from the device shown in FIGS. 11 and 12 only in that the tips of channels 60 reach a light-incident end face 43.

Figure 14:
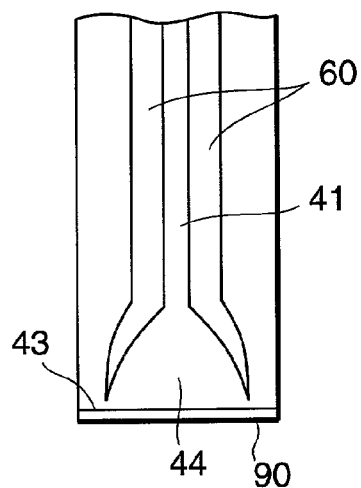
FIG. 14 is a plan view excluding electrodes, of a further modification of the semiconductor waveguide device according to the second embodiment.

Furthermore, FIG. 14 is a plan view (excluding electrodes) showing a further modification of the semiconductor waveguide device according to the second embodiment. The example shown in FIG. 14 is different from the device illustrated in FIGS. 11 and 12 only in that the tips of channels 60 are arced.

Figure 15:
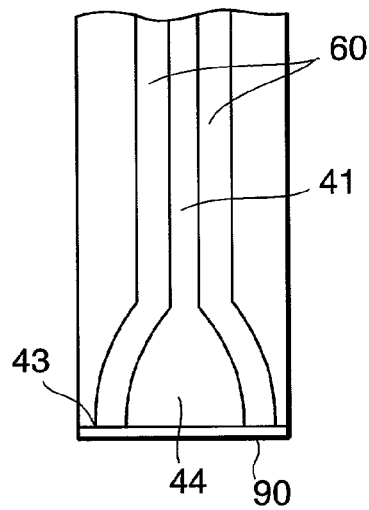
FIG. 15 is a plan view excluding electrodes, of a still further modification of the semiconductor waveguide device according to the second embodiment.

FIG. 15 is a plan view (excluding electrodes) showing a still further modification of the semiconductor waveguide device according to the second embodiment. The example shown in FIG. 15 is different from the device shown in FIGS. 9 and 10 only in that the tips of channels 60 are arced.

In a manner similar to the device shown in FIGS. 9 and 10, the respective modifications shown in FIGS. 11 through 15 are also capable of suppressing interference between output light and multiple reflected light, outputting a high-quality optical modulation signal reduced in interference noise, reducing an error rate, and enlarging a transmission distance.

Figure 16:
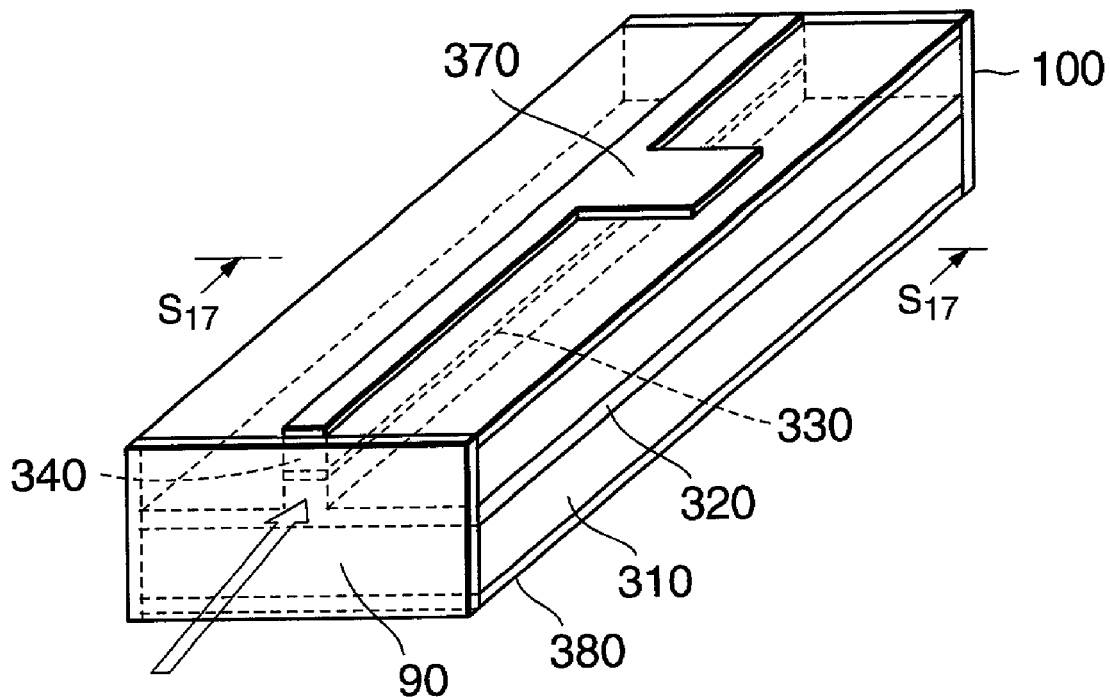
FIG. 16 is a perspective view schematically showing a configuration of a semiconductor waveguide device according to a third embodiment of the present invention.
Figure 17:
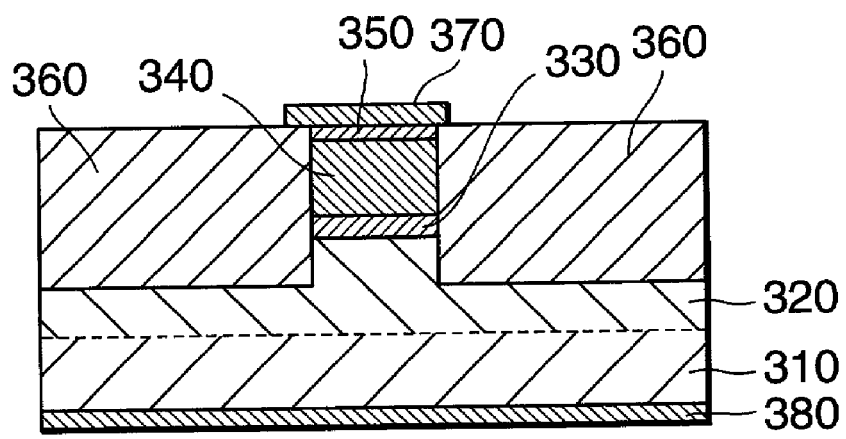
FIG. 17 is a cross-sectional view taken along line $S_{17}$—$S_{17}$ of FIG. 16.

FIG. 16 is a perspective view schematically showing a configuration of a semiconductor waveguide device according to a third embodiment of the present invention. FIG. 17 is a cross-sectional view taken along line $S_{17}$—$S_{17}$ of FIG. 16.

As shown in FIG. 16, the semiconductor waveguide device according to the third embodiment is a device having a buried hereto structure (BH structure). The semiconductor waveguide device has a substrate 310 formed of a first conductive type semiconductor, a lower clad layer 320 formed of the first conductive type semiconductor, which is provided over the substrate 310, an optical waveguide layer (active layer or core layer) 330 provided over the lower clad layer 320, an upper clad layer 340 formed of a second conductive type semiconductor provided over the optical waveguide layer 330, and an ohmic contact layer 350 provided over the upper clad layer 340. In the third embodiment, the substrate 310 is formed of $n^+$-InP, the lower clad layer 320 is formed of n-InP, the optical waveguide layer 330 is formed of undoped (impurity implanting process-free)—InGaAsP, the upper clad layer 340 is formed of p-InP, and the ohmic contact layer 350 is formed of $p^+$-InGaAs, respectively. However, materials for the respective layers are not necessarily limited to those referred to above. Both sides of a stripe of a rib type waveguide are buried by undoped-InP (whose impurity carrier concentration is less than or equal to $1 \times 10^{17}$ cm$^{-3}$). Here, an embedding material may make use of other semiconductor materials if they have a lattice-matched relation to the optical waveguide layer 30.

Further, the semiconductor waveguide device according to the third embodiment includes a second conductive type upper electrode 370 provided on the ohmic contact layer 350, and a first conductive type lower electrode 380 provided on the underside of the substrate 310. Anti-reflective films 90 and 100 are formed on their corresponding light incoming/outgoing end faces.

In the semiconductor waveguide device according to the third embodiment, heat generated in the optical waveguide layer 330 due to the incidence of light thereon is efficiently dissipated in a transverse direction through the undoped-InGaAsP used as the embedding material. Thus, the present semiconductor waveguide device can obtain an effect similar to the semiconductor waveguide device according to the first embodiment.

While a process step for growing a crystal for a semiconductor material that constitutes the semiconductor waveguide device according to the third embodiment, is required twice, a process step for charging polyimide into the channels as in the case of the first embodiment can be omitted. Therefore, a production process becomes no complex and a reduction in the cost of the device can be realized.

Further, since the device can be designed in such a way that a mode profile of light becomes substantially circular, high coupling efficiency can be realized even without via a lens upon optical coupling to an optical fiber.

Furthermore, according to the device of the third embodiment, since an excessive increase in electric capacity in the slab region employed in the first embodiment can be eliminated, a high-speed operation can be expected.

Figure 18:
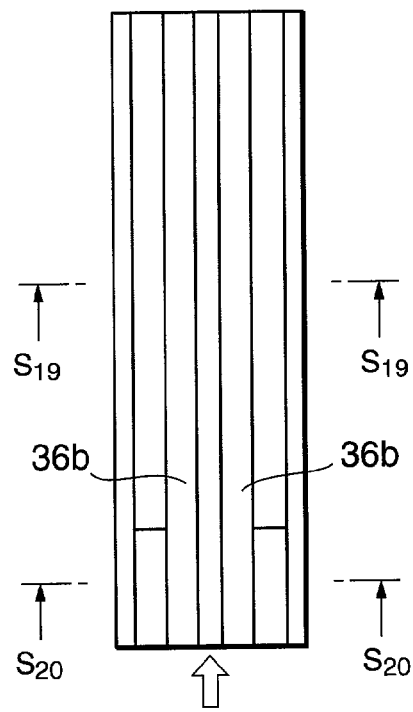
FIG. 18 is a plan view schematically illustrating a configuration excluding electrodes, of a semiconductor waveguide device according to a fourth embodiment of the present invention.
Figure 19:
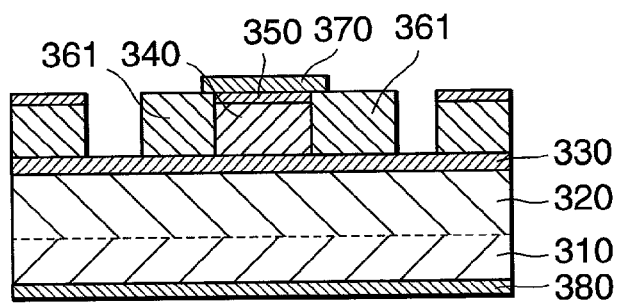
FIG. 19 is a cross-sectional view taken along line $S_{19}$—$S_{19}$ of FIG. 18.
Figure 20:
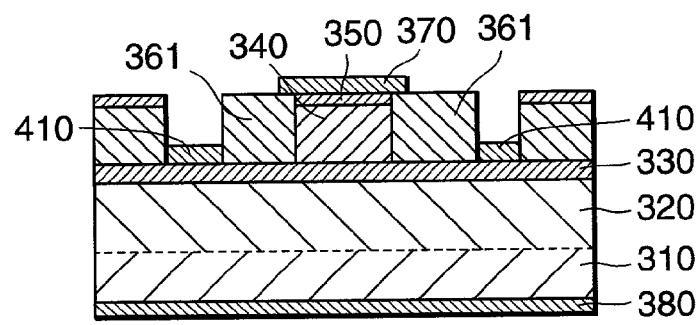
FIG. 20 is a cross-sectional view taken along line $S_{20}$—$S_{20}$ of FIG. 18.

FIG. 18 is a plan view (excluding electrodes) schematically showing a configuration of a semiconductor waveguide device according to a fourth embodiment of the present invention. FIG. 19 is a cross-sectional view taken along $S_{19}$—$S_{19}$ of FIG. 18, and FIG. 20 is a cross-sectional view taken along line $S_{20}$—$S_{20}$ of FIG. 18, respectively.

In the semiconductor waveguide device according to the fourth embodiment, an upper clad layer 340 has a stripe-like ridged structure narrower in width than a lower clad layer 320. Metal members 410 are located on both sides of ridged structures of buried layers 361 (corresponding to layers formed of the same material as the buried layers 360) on the sides of the upper clad layer 340 and provided on an optical waveguide layer 330. The metal members 410 are in no electrical contact with an electrode 350 connected to a waveguide itself. A metal is commonly extremely high in thermal conductivity and hence heat generated by a light absorption current can be efficiently dissipated. When the device is mounted junction down on a carrier (see FIG. 23 to be described later), the radiation of heat through the metal members 410 can be improved as well as the dissipation of heat through a signal line electrode.

Figure 21:
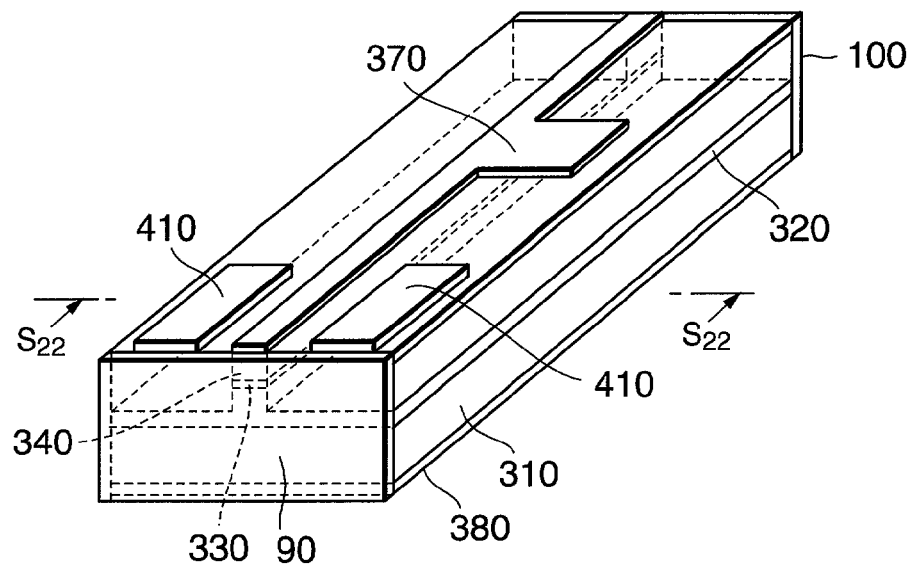
FIG. 21 is a perspective view schematically showing configuration of the semiconductor waveguide device according to a fifth embodiment of the present invention.
Figure 22:
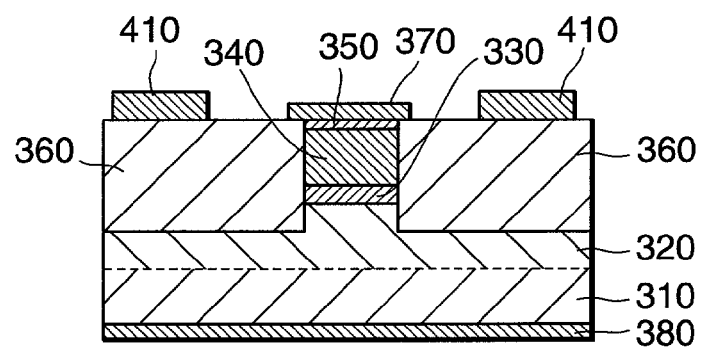
FIG. 22 is a cross-sectional view taken along line $S_{22}$—$S_{22}$ of FIG. 21.
Figure 23:
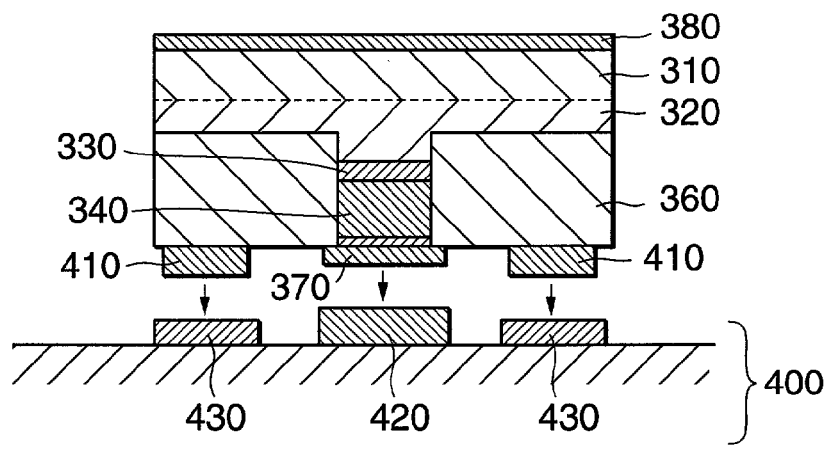
FIG. 23 is a diagram for describing junction down mounting.

FIG. 21 is a perspective view schematically showing a configuration of a semiconductor waveguide device according to the fifth embodiment of the invention. FIG. 22 is a cross-sectional view taken along line $S_{22}$—$S_{22}$ of FIG. 21, and FIG. 23 is diagram for describing a case in which the device shown in FIG. 21 is mounted junction down on an electrode 420 and metal members 430 of a carrier 400. The semiconductor waveguide device shown in FIGS. 21 through 23 can also obtain an effect similar to the example illustrated in FIGS. 18 through 20. Further, the dissipation of heat can be carried out more efficiently through the side of a heat-radiating metal formed on the carrier as well as the dissipation of heat through a signal line electrode. Furthermore, the strength of adhesion of the semiconductor waveguide device to the carrier can also be improved.

Figure 24:
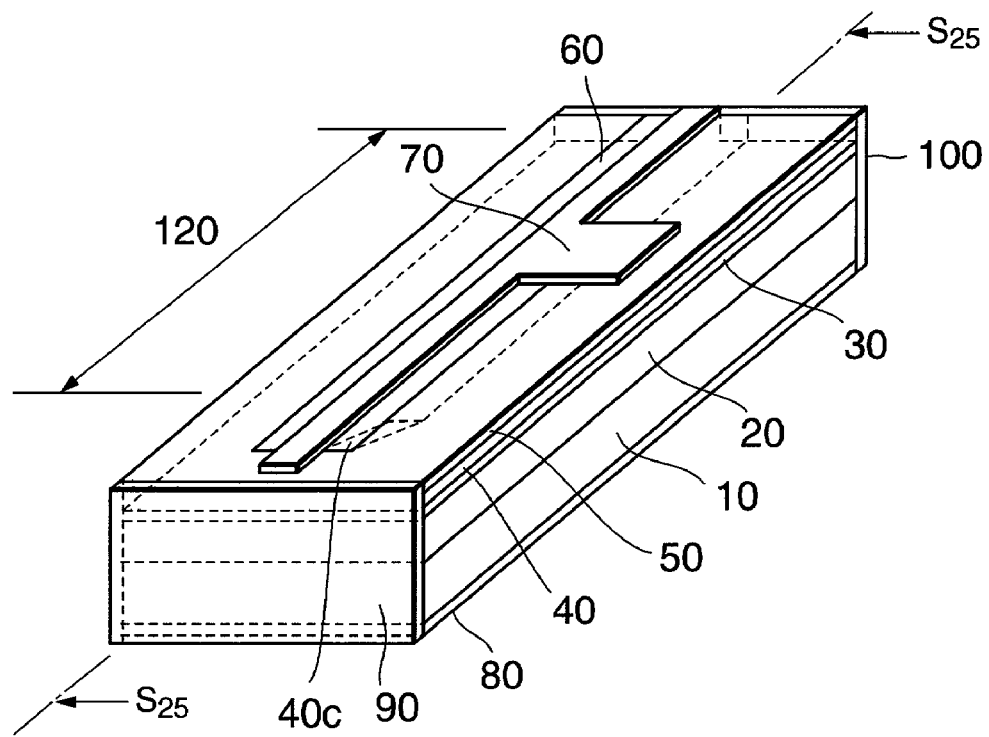
FIG. 24 is a perspective view schematically showing a configuration of a semiconductor waveguide device according to a sixth embodiment of the present invention.
Figure 25:
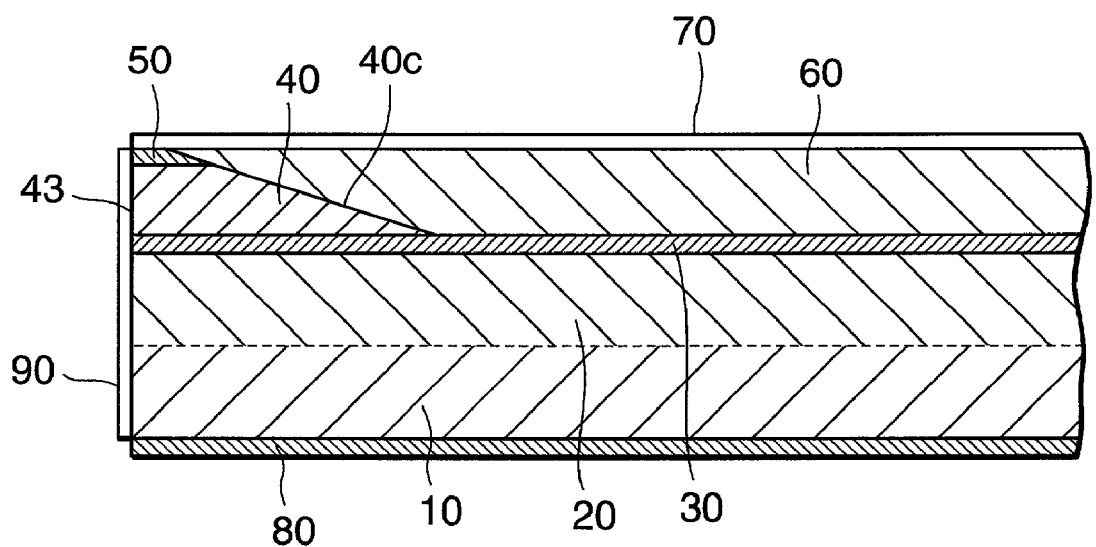
FIG. 25 is a cross-sectional view taken along line $S_{25}$—$S_{25}$ of FIG. 24.

FIG. 24 is a perspective view schematically showing a configuration of a semiconductor waveguide device according to a sixth embodiment of the present invention. FIG. 25 is a cross-sectional view taken along line $S_{25}$—$S_{25}$ of FIG. 24. In FIGS. 24 and 25, portions identical or corresponding to the elements of structure of the device according to the first embodiment shown in FIGS. 1 through 4 are respectively identified by the same reference numerals. The semiconductor waveguide device according to the sixth embodiment is different from the device according to the first embodiment 1 in that an upper clad layer 40 is formed in such a manner that the depth of a channel 60 becomes shallow as it approaches a light-incident end face 43, and the tip of the channel 60 extends to near the light-incident end face 43 or a position where it reaches the light-incident end face 43. According to the device of the sixth embodiment, since the radiation of heat in a horizontal direction by the upper clad layer 40 becomes satisfactory near the light-incident end face 43, an effect similar to one obtained by the device according to the first embodiment is obtained. Incidentally, points other than the above in the fifth embodiment are identical to those in the first embodiment.

FIGS. 26(a) through 30(c) respectively schematically show one example of a method (corresponding to the formation of two devices) for manufacturing the semiconductor waveguide device shown in FIG. 24, wherein FIGS. 26(b) through 30(b) are plan views, and FIGS. 26(a) through 30(a) and FIG. 30(c) are cross-sectional views, respectively.

In this manufacturing method, a lower clad layer 20, an optical waveguide layer 30, and a first upper clad layer 40a are first successively deposited over a substrate 10 as shown in FIGS. 26(a) and 26(b). Here, the first upper clad layer 40a is about 0.2 $\mu$m thick.

Next, as shown in FIGS. 27(a) and 27(b), a first mask 130 is formed on the first upper clad layer 40a in such a manner that a width-broadened exposed portion 40aa and a width-narrowed exposed portion 40ab are formed within the first upper clad layer 40a. Here, the width-narrowed exposed portion 40ab is equivalent to a portion which serves as a light-incident end face of the semiconductor waveguide device. The mask 130 comprises $SiO_2$. A flat form of the mask 130 is not limited to one shown in FIG. 27(b). The flat form of the mask 130 is not limited to a rectangle and may be one having such a curved end as to become narrow at the portion serving as the light-incident end face of the semiconductor waveguide device.

Next, as shown in FIGS. 28(a) and 28(b), a second upper clad layer 40b and an ohmic contact layer 50 are deposited so as to cover the first upper clad layer 40a. At this time, they are grown thick at the portion that serves as the light-incident end face of the semiconductor waveguide device as shown in FIG. 28(a). Incidentally, no crystal growth occurs on the first mask 130.

Next, as shown in FIGS. 29(a) and 29(b), second masks 140 provided with two openings 140a at channel forming portions are formed on the ohmic contact layer 50. The masks 140 comprise $SiO_2$.

Figure 30A:
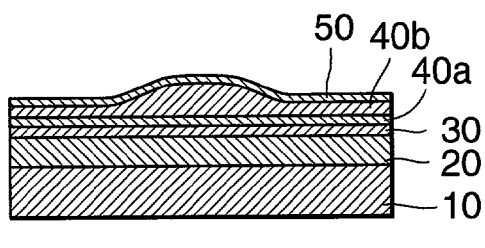
FIGS. 30(a), 30(b), and 30(c) are respectively process diagrams (part 5) illustrating the method of manufacturing the semiconductor waveguide device shown in FIG. 24.
Figure 30B:
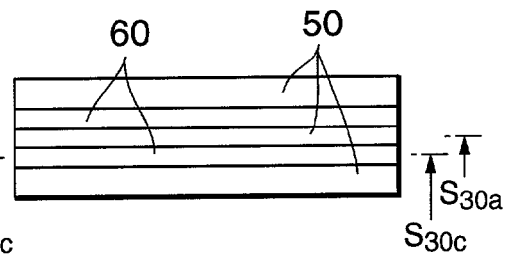
Figure 30C:
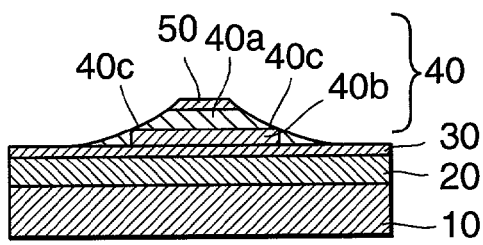

Next, the ohmic contact layer 50, the second upper clad layer 40b and the first upper clad layer 40a provided at the openings 140a of the second mask 140 are dry-etched and thereafter the second masks 140 are removed. At this time, as shown in FIGS. 30(a) and 30(c), the upper clad layer 40 remains at the portion which serves as the light-incident end face of the semiconductor waveguide device, and such inclined portions constituting a channel bottom as indicated by reference numerals 40c in FIG. 30(c) are formed thereat.

FIGS. 31(a) through 34(c) respectively schematically show another example of the method (corresponding to the formation of two devices) of manufacturing the semiconductor waveguide device shown in FIG. 24, wherein FIGS. 31(b) through 34(b) are plan views, and FIGS. 31(a) through 34(a) and FIG. 34(c) are cross-sectional views, respectively.

Figure 31A:
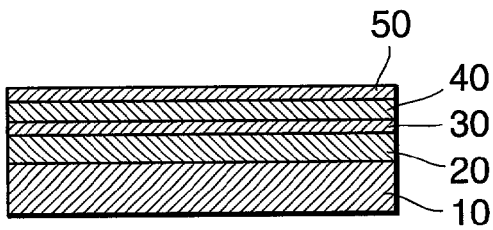
FIGS. 31(a) and 31(b) are respectively process diagrams (part 1) depicting another method of manufacturing the semiconductor waveguide device shown in FIG. 24.
Figure 31B:
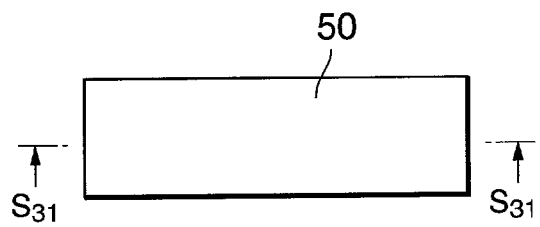

In the present manufacturing method, a lower clad layer 20, an optical waveguide layer 30, an upper clad layer 40, and an ohmic contact layer 50 are first successively deposited over a substrate 10 as shown in FIGS. 31(a) and 31(b).

Figure 32A:
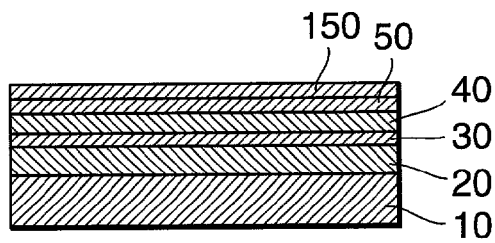
FIGS. 32(a) and 32(b) are respectively process diagrams (part 2) showing another method of manufacturing the semiconductor waveguide device shown in FIG. 24.
Figure 32B:
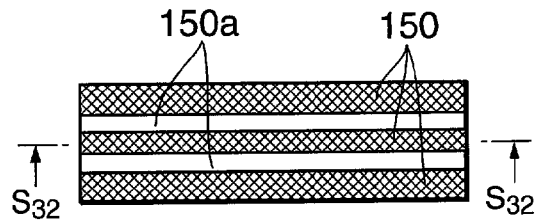

Next, as shown in FIGS. 32(a) and 32(b), second masks 150 provided with two openings 150a at channel forming portions are formed on the ohmic contact layer 50. The masks 150 comprise $SiO_2$.

Figure 33A:
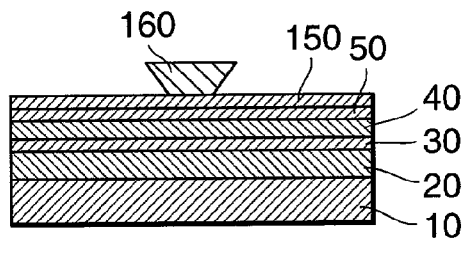
FIGS. 33(a) and 33(b) are respectively process diagrams (part 3) illustrating another method of manufacturing the semiconductor waveguide device shown in FIG. 24.
Figure 33B:
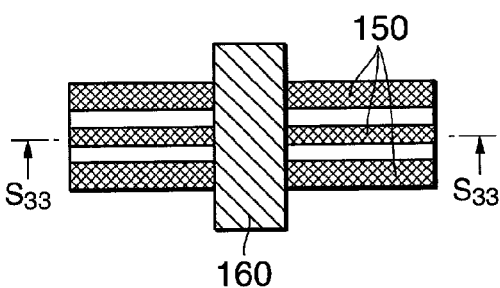

Next, as shown in FIGS. 33(a) and 33(b), a shielding body 160 having an inverted mesa structure is placed on the openings 150a of the masks 150 and disposed over a portion that serves as a light-incident end face of the semiconductor waveguide device.

Figure 34A:
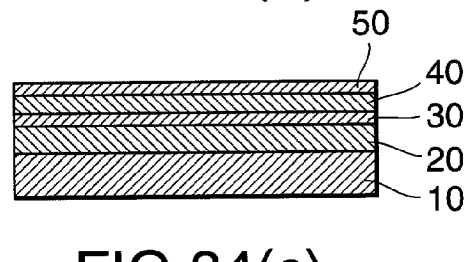
FIGS. 34(a), 34(b), and 34(c) are respectively process diagrams (part 4) showing another method of manufacturing the semiconductor waveguide device shown in FIG. 24.
Figure 34B:
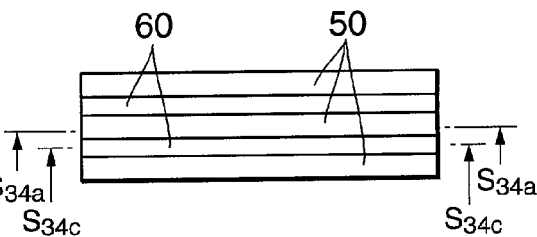
Figure 34C:
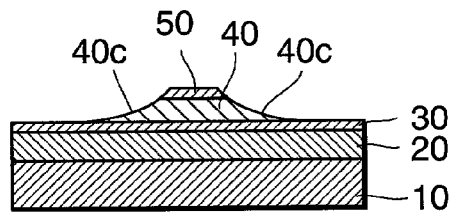

Next, as shown in FIGS. 34(a), 34(b) and 34(c), an upper clad layer 40 provided at openings 150a of masks 150 is dry-etched and thereafter the masks 150 are removed. At this time, as shown in FIGS. 34(a) and 34(c), the upper clad layer 40 remains at a portion which serves as a light-incident end face of a semiconductor waveguide device, and such inclined portions constituting a channel bottom as indicated by reference numerals 40c in FIG. 34(c) are formed.

Figure 35:
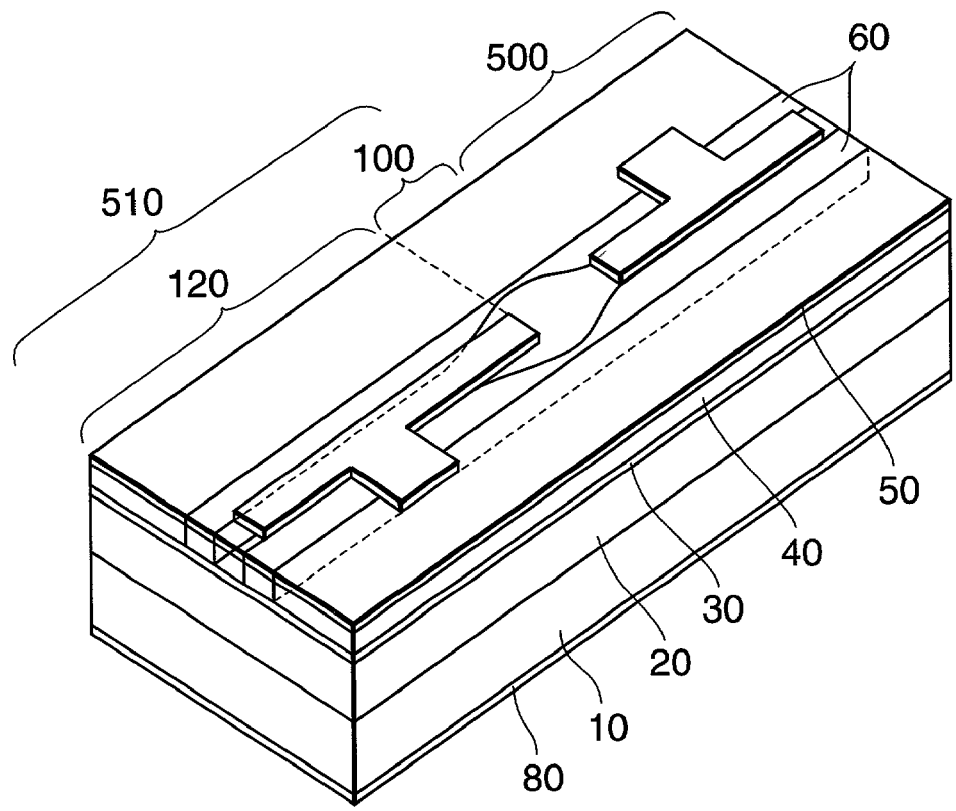
FIG. 35 is a perspective view schematically showing a configuration of a semiconductor waveguide device according to a seventh embodiment of the present invention.

FIG. 35 is a perspective view schematically showing a semiconductor waveguide device according to a seventh embodiment of the present invention. As shown in FIG. 35, the semiconductor waveguide device according to the seventh embodiment includes a single substrate 10, and a semiconductor laser unit 500 and a semiconductor optical functional unit 510 both formed over the substrate 10. In the seventh embodiment, the semiconductor optical functional unit 510 modulates laser light emitted from the semiconductor laser unit 500. The semiconductor laser unit 500 and the semiconductor optical functional unit 510 have common channels 60, which become narrow in width such that upper clad layers 40 at a portion for connection between the semiconductor laser unit 500 and the semiconductor optical functional unit 510 become broad in width. Since the semiconductor optical functional unit 510 employed in the seventh embodiment has a function similar to the semiconductor waveguide device according to the second embodiment, an effect similar to the second embodiment can be obtained.

Incidentally, a unit (e.g., a semiconductor optical amplifier, a variable optical attenuator or the like) for amplifying or attenuating the amplitude of the laser light may be provided as an alternative to the semiconductor laser 500. In place of the semiconductor optical functional unit 510, the structures of other semiconductor waveguide devices according to the first through sixth embodiments may be adopted.

Figure 36:
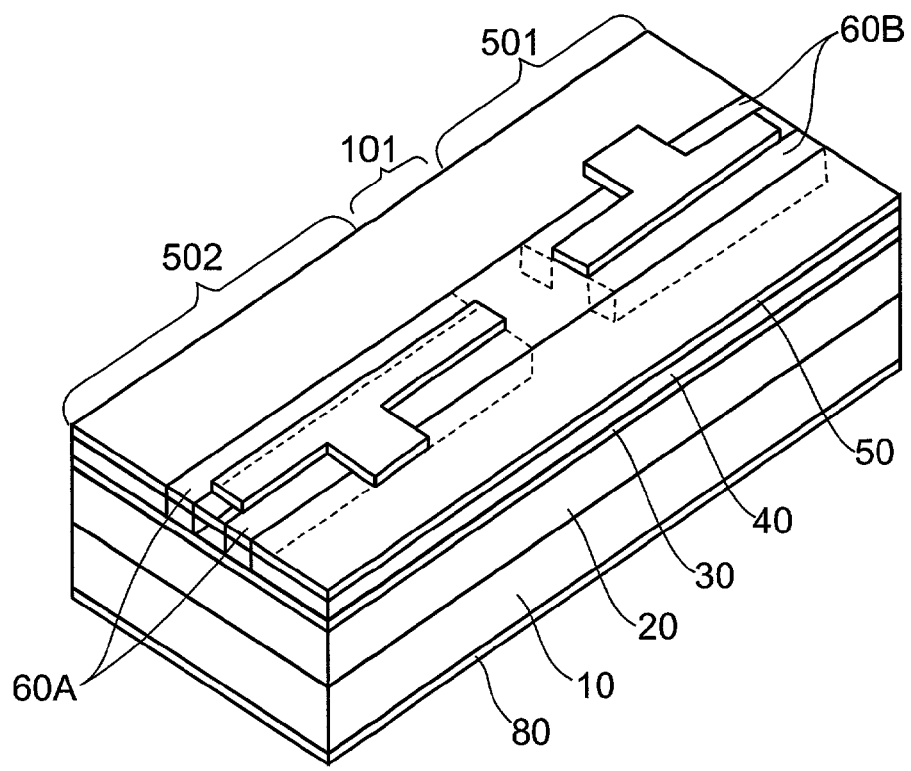
FIG. 36 is a perspective view schematically showing another configuration of a semiconductor waveguide device according to a modification of the seventh embodiment of the present invention.

FIG. 36 is a perspective view schematically showing another configuration of a semiconductor waveguide device according to a modification of the seventh embodiment of the present invention. In the modification, two separate semiconductor optical devices 501 and 502 are formed on a single substrate 10. Since the semiconductor optical devices 501 and 502 are independent, each of the devices has independent channels 60A or 60B. A waveguide portion 101 is provided between the devices 501 and 502. In the waveguide portion 101, no channel and no electrode is formed. However, the electrodes of the devices 501 and 502 may be extended to the waveguide portion 101.

The modification of the seventh embodiment has similar effect and function of the original seventh embodiment. The devices 501 and 502 of the modification may be adopted as a semiconductor laser and an EA device.

Incidentally, the first through seventh embodiments are not necessarily limited to plane orientation of the crystal in the substrate 10, or the direction of formation of the stripe. In the first through sixth embodiments as well, no limitations are imposed on the method of forming and growing the optical waveguide layers in their corresponding regions.

Further, each of the structures of the optical waveguide layers 30 employed in the first through seventh embodiments may be a multiple quantum well structure. Furthermore, while the heat radiation structure is formed only on one end face side in the first through seventh embodiments, it may be formed on the other end face side. The semiconductor waveguide devices according to the first through seventh embodiments are not limited to the EA modulator but may be the SA device.

According to the invention as described above, an advantageous effect may be obtained in that since heat generated due to a photocurrent may be efficiently radiated, allowable input light power may be enhanced.

According to the invention as well, an advantageous effect may be obtained in that it may possible to suppress interference between output light and multiple reflected light, output a high-quality optical modulation signal reduced in interference noise, reduce an error rate, and enlarge a transmission distance.

Further, according to the invention, an advantageous effect may be obtained in that since such an upper clad layer that the depth of each channel becomes shallow as it approaches a light-incident end face, may be formed in a simple process, a reduction in the cost of a device may be achieved.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A semiconductor waveguide device comprising:
   a lower clad layer;
   an upper clad layer including a stripe-shaped portion having a first width and a width-broadened portion formed at a position close to a light-incident end face, the width-broadened portion having a second width wider than the first width, the width-broadened portion being located at a center of the end face;
   an optical waveguide layer interposed between said lower clad layer and said upper clad layer, said optical waveguide layer including an end face having the second width at which light is received; and
   a lower electrode and an upper electrode for applying a voltage to a laminated structure including said lower clad layer, said optical waveguide layer, and said upper clad layer, wherein light is made incident from the end face of said optical waveguide layer.

2. The semiconductor waveguide device as claimed in claim 1, wherein the width-broadened portion of said upper clad layer, said lower clad layer, and portions of said optical waveguide layer superimposed on the width-broadened portion form a slab type waveguide structure.

3. The semiconductor waveguide device as claimed in claim 1, wherein the width-broadened portion of said upper clad layer becomes wide as said width-broadened portion approaches said light-incident end face.

4. The semiconductor waveguide device as claimed in claim 1, wherein channels are respectively formed on both sides of said upper clad layer.

5. The semiconductor waveguide device as claimed in claim 4, wherein the width of said each channel becomes narrow as said channel approaches said light-incident end-face.

6. The semiconductor waveguide device as claimed in claim 1, wherein said optical waveguide layer has the same width as said upper clad layer.

7. The semiconductor waveguide device as claimed in claim 1, wherein said upper electrode extends from the width-narrowed portion of said upper clad layer to the width-broadened portion thereof.

8. A semiconductor waveguide device comprising:
a lower clad layer having a first width;
an upper clad layer having a stripe shape and having a second width narrower than the first width;
an optical waveguide layer interposed between said lower clad layer and said upper clad layer, said optical waveguide layer having a stripe shape and having a third width narrower than the first width, said optical waveguide layer having an end face at which light is received;
a lower electrode and an upper electrode for applying a voltage to a laminated structure including said lower clad layer, said optical waveguide layer, and said upper clad layer; and
a semiconductor laminated body being in close proximity to the side faces of said upper clad layer and said optical waveguide layer and formed of a semiconductor material whose impurity carrier concentration is at least less than or equal to $1 \times 10^{17} cm^3$, wherein light is made incident from the end face of said optical waveguide layer.

9. The semiconductor waveguide device as claimed in claim 8, wherein said semiconductor laminated body is formed of a semiconductor material having a lattice-matched relation to a semiconductor material which constitutes said optical waveguide layer.

10. A semiconductor waveguide device comprising:
a lower clad layer;
an upper clad layer;
an optical waveguide layer interposed between said lower clad layer and said upper clad layer, said optical waveguide layer having an end face at which light is received;
a lower electrode and an upper electrode for applying a voltage to a laminated structure including said lower clad layer, said optical waveguide layer, and said upper clad layer; and
at least one metal member provided in the neighborhood of the end face of said optical waveguide layer,
wherein light is made incident from the end face of said optical waveguide layer, and
wherein said upper clad layer has channels for exposing said optical waveguide layer, and said metal member is provided on said optical waveguide layer lying within said each channel.

11. A semiconductor waveguide device comprising:
a lower clad layer;
an upper clad layer having a stripe-like part;
an optical waveguide layer interposed between said lower clad layer and said upper clad layer, wherein light is made incident into said optical waveguide layer from an end face of said optical waveguide layer;
channels respectively formed so as to leave part of said upper clad layer in stripe form on both sides of said stripe-like part, wherein each channel has a depth that becomes shallow as said channel approaches the light-incident end face; and
a lower electrode and an upper electrode for applying a voltage to a laminated structure including said lower clad layer, said optical waveguide layer and said upper clad layer.

12. The semiconductor waveguide device as claimed in claim 11, wherein the end of said each channel is formed so as to reach said light-incident end face.

13. The semiconductor waveguide device as claimed in claim 11, wherein the end of said each channel is formed so as not to reach said light-incident end face.

14. A semiconductor waveguide device comprising:
a semiconductor substrate having a main surface and a back surface;
a lower electrode formed on the back surface of the substrate;
a lower clad layer formed on the main surface of the substrate;
an optical waveguide layer formed on the lower clad layer, said optical waveguide layer having an end face at which light is received;
an upper clad layer formed on the optical waveguide layer, the upper clad layer including a first stripe-shaped portion and a second stripe-shaped portion;
a first upper electrode formed on the first strip-shaped portion of the upper clad layer; and
a second upper electrode formed on the second stripe-shaped portion of the upper clad layer,
wherein the first upper electrode and the first stripe-shaped portion of the upper clad layer operate as a first optical semiconductor device, and
wherein the second upper electrode and the second stripe-shaped portion of the upper clad layer operate as a second optical semiconductor device.

15. A semiconductor waveguide device as claimed in claim 14, further comprising a first pair of channels formed on both sides of the first stripe-shaped portion of the upper clad layer and a second pair of channels formed on both sides of the second stripe-shaped portion of the upper clad layer.

16. A semiconductor waveguide device as claimed in claim 15, wherein the first and second pairs of channels are connected by a narrower pair of channels.

17. A semiconductor waveguide device as claimed in claim 15, wherein the first and second pairs of channels are separated by a waveguide portion.

18. A semiconductor waveguide device as claimed in claim 14, wherein the first upper electrode has a first width-broadened portion at a first side of the first upper electrode and wherein the second upper electrode has a second width-broadened portion at a second side of the second upper electrode, the second side being opposite to the first side.

19. A semiconductor waveguide device as claimed in claim 14, wherein the first semiconductor device is a semiconductor laser and the second semiconductor device is an electric absorption type optical device.

* * * * *